United States Patent
Weis (10) Patent No.: US 11,716,031 B2
(45) Date of Patent: Aug. 1, 2023

(54) CIRCUIT ASSEMBLY FOR NEUTRAL POINT CLAMPED INVERTERS THAT ARE PROTECTED FROM INCORRECT COMMUTATIONS

(71) Applicant: Siemens Aktiengesellschaft, Munich (DE)

(72) Inventor: Benno Weis, Hemhofen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/046,359

(22) PCT Filed: Apr. 30, 2019

(86) PCT No.: PCT/EP2019/058370
§ 371 (c)(1),
(2) Date: Oct. 9, 2020

(87) PCT Pub. No.: WO2019/197236
PCT Pub. Date: Oct. 17, 2019

(65) Prior Publication Data
US 2021/0257926 A1    Aug. 19, 2021

(30) Foreign Application Priority Data
Apr. 10, 2018    (EP) .................................... 18166543

(51) Int. Cl.
*H02M 7/487*    (2007.01)
*H02M 1/08*    (2006.01)
*H02M 1/32*    (2007.01)

(52) U.S. Cl.
CPC ............. *H02M 7/487* (2013.01); *H02M 1/08* (2013.01); *H02M 1/32* (2013.01)

(58) Field of Classification Search
CPC ........... H02M 7/487; H02M 1/08; H02M 1/32
See application file for complete search history.

(56) References Cited

U.S. PATENT DOCUMENTS

2005/0281065 A1    12/2005  Nojima
2017/0085125 A1*   3/2017   Ghosh .................... H02M 7/487

FOREIGN PATENT DOCUMENTS

| DE | 102012205080 | 10/2013 | |
|----|---|---|---|
| EP | 1619782 B1 * | 8/2017 | ............. H02M 1/38 |
| JP | 2002165462 | 6/2002 | |
| WO | 2015133985 | 9/2015 | |

OTHER PUBLICATIONS

PCT International Search Report dated Jul. 23, 2019 based on PCT/EP2019/058370 filed Apr. 3, 2019.

\* cited by examiner

*Primary Examiner* — Kyle J Moody
*Assistant Examiner* — Jye-June Lee
(74) *Attorney, Agent, or Firm* — Cozen O'Connor (57) ABSTRACT

A neutral point clamped inverter with an upper half-bridge and a lower half-bridge, wherein each half-bridge has an inner transistor and an outer transistor, where the inner transistor of the upper half-bridge is configured to interact with the outer transistor of the upper half-bridge such that a signal that reproduces the switch state of the inner transistor is coupled into an actuation circuit for switching the outer transistor and influences the switch state of the outer transistor.

2 Claims, 7 Drawing Sheets

FIG 1

-- Prior Art --

CIRCUIT ASSEMBLY FOR NEUTRAL POINT CLAMPED INVERTERS THAT ARE PROTECTED FROM INCORRECT COMMUTATIONS

CROSS-REFERENCE TO RELATED APPLICATIONS

This is a U.S. national stage of application No. PCT/EP2019/058370 filed 3 Apr. 2019. Priority is claimed on European Application No. 18166543.1 filed 10 Apr. 2018, the content of which is incorporated herein by reference in its entirety.

BACKGROUND OF THE INVENTION

1. Field of the Invention

The invention relates to a neutral point clamped (NPC) inverter with an upper half bridge and a lower half bridge.

2. Description of the Related Art

Figure 1:
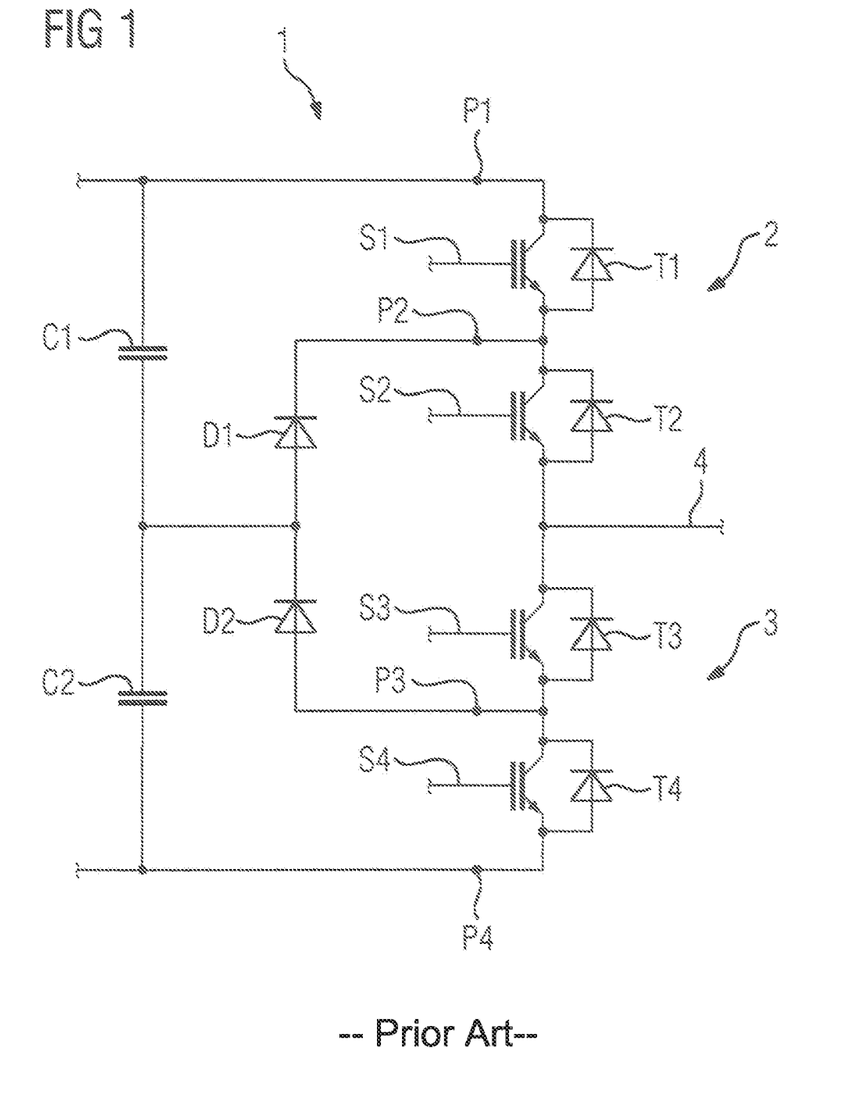
FIG. 1 shows a circuit diagram of a neutral point clamped inverter in accordance with the prior art.

Shown in FIG. 1 is a neutral point clamped inverter 1 in accordance with the prior art. For reasons of clarity, only the circuit for one phase is shown in each case for FIG. 1 and also for FIGS. 2 to 6 explained below. The principles described are able to be transferred in a similar way to multiphase inverters.

The term NPC stands for neutral point clamped. An inverter of this type represents an expansion of a two-level inverter and, by contrast with the inverter, can implement not just two voltage levels but three. This is achieved by a neutral voltage additionally being able to be set at the output of the inverter.

The neutral point clamped inverter 1 shown in FIG. 1 comprises an upper half bridge 2 and a lower half bridge 3.

The upper half bridge 2 comprises a capacitor C1, a diode D1, two transistors T1, T2 and also two activation circuits S1, S2 for the transistors T1, T2. The transistor T1 arranged further up in the plane of the drawing in FIG. 1 is an outer transistor T1 of the upper half bridge 2. The transistor T2 arranged further down in the plane of the drawing in FIG. 1 is an inner transistor T1 of the upper half bridge 2. A respective switch state (on state, off state) of the transistors T1, T2 can be controlled via the activation circuits S1, S2.

The lower half bridge 3 comprises a capacitor C2, a diode D2, two transistors T3, T4 and also two activation circuits S3, S4 for the transistors T3, T4. The transistor T3 arranged further up in the plane of the drawing in FIG. 1 is an inner transistor T3 of the lower half bridge 3. The transistor T4 arranged further down in the plane of the drawing in FIG. 1 is an outer transistor T4 of the lower half bridge 3. A respective switch state (on state, off state) of the transistors T3, T4 can be controlled via the activation circuits S3, S4.

The principle known per se by which these arrangements function will not be discussed in greater detail in this context. The important point is that a commutation sequence for a flow of current in the neutral point clamped inverter 1 is adhered to in an orderly manner. Above all, it must be insured that the two outer transistors T1, T4 may only be switched on when the associated inner transistors T2, T3 are likewise switched on. If this condition is violated, then there is the danger of the inner transistors T2, T3 being overloaded in terms of voltage.

In principle, this dangerous situation can arise in two ways:

a) Both transistors T1, T2, T3, T4 of a half bridge 2, 3, for example, the transistors T1, T2 of the upper half bridge 2, are switched on (e.g., in the on state) and the inner transistor T2 switches off (i.e., it goes into the off state), before the outer transistor T1 has been switched off. This can be triggered, for example, in the event of a short circuit with desaturation monitoring, by the inner transistor T2 switching off. It can also occur when a gate voltage supply of the inner transistor T2 falls below its minimum value. Moreover, the cause can lie in a sudden pulse block of the neutral point clamped inverter 1.

b) Both transistors T1, T2, T3, T4 of a half bridge 2, 3, for example the transistors T1, T2 of the upper half bridge 2, are switched off and the outer transistor T1 switches on before the inner transistor T1 is switched on. This situation does not occur as a rule with correct activation, but is also dealt with however within the context of the information provided below.

In order to avoid this, it is known that the activation pulses created by the activation circuits S1, S2, S3, S4 for the transistors T1, T2, T3, T4 can be generated accordingly by a higher-ranking control logic. This, for example, includes both transistors T1, T2, T3, T4 of a half bridge never switching simultaneously in normal operation but the outer transistors T1, T4 only ever being switched to the on state after the inner transistors T2, T3, so that an outer potential P1, P4 is provided in each case after an inner potential P2, P3 to an output 4 of the neutral point clamped inverter 1.

However, this does not insure in all cases that the inner transistor T2 is never switched off while the outer transistor T1 is switched on. For the operating situations listed under point a) the transistor T2 will always be switched off independently without the transistor T1 necessarily already having been switched off. This can be avoided in the prior art by the transistor T2 supplying a feedback message about its current switching state to the higher-ranking control logic, which then likewise switches off the transistor T1. This feedback message requires that a potential be disconnected however, which involves costs. Moreover, the impermissible state is still present for a certain time.

Activation circuits for transistors are disclosed in WO 2015/133985 A1 and JP 2002 165462 A, which require a disadvantageous disconnection of potential.

SUMMARY OF THE INVENTION

It is an object of the invention to provide a neutral point clamped inverter that is protected in a low-cost manner from incorrect commutations and that avoids the disadvantages of the above-mentioned prior art.

This and other objects and advantages are achieved in accordance with the invention by a neutral point clamped inverter with an upper half bridge and a lower half bridge, wherein each half bridge has an inner transistor and an outer transistor.

The neutral point clamped inverter is formed such that the inner transistor of the upper half bridge is configured to interact with the outer transistor of the upper half bridge such that a signal that reproduces the switch state of the inner transistor is coupled directly into an activation circuit for switching the outer transistor and directly influences a switch state of the outer transistor.

A "direct" coupling in or influencing means, in this case, that an effect of the signal that reproduces the switch state of the inner transistor acts on the switch state of the outer transistor without any potential disconnection. This is where the inventive neutral point clamped inverter differentiates itself from conventional solutions in which the inner transistor supplies a feedback message about its current switch state to a higher-ranking control logic. To accomplished this, however, a potential disconnection is required, which involves costs. In addition, the above-described impermissible states are still present for a short period of time.

The objects of the invention are also achieved by a neutral point clamped inverter with an upper half bridge and a lower half bridge, wherein each half bridge has an inner transistor and an outer transistor.

The neutral point clamped inverter is formed such that the inner transistor of the lower half bridge is configured to interact with the outer transistor of the lower half bridge such that a signal that reproduces the switch state of the inner transistor is coupled directly into an activation circuit for switching the outer transistor and directly influences a switch state of the outer transistor. Here, the activation circuit has a bridging element that is configured to interrupt for a specific period of time a direct influencing of the switch state of the outer transistor by the signal that reproduces the switch state of the inner transistor.

A "direct" coupling in or influencing similarly means, in this case, that an effect of the signal that reproduces the switch state of the inner transistor acts on the switch state of the outer transistor without any potential disconnection.

In accordance with the invention, the upper half bridge and the lower half bridge of the neutral point clamped inverter are each configured in the above-described manner.

The inventive neutral point clamped inverters each insure with little outlay that the above-described forbidden states (a and b) do not occur.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The characteristics, features and advantages of this invention described above, as well as the manner in which these are achieved, will become clearer and easier to understand in conjunction with the description given below of the exemplary embodiments, which will be explained in greater detail in conjunction with the drawings, in which.

DETAILED DESCRIPTION OF THE EXEMPLARY EMBODIMENTS

For reasons of clarity only the circuit for one phase is shown in each case for FIG. 2 and also for FIGS. 3 to 6 explained below. The principles described can be transferred in a similar way to multiphase inverters.

Figure 2:
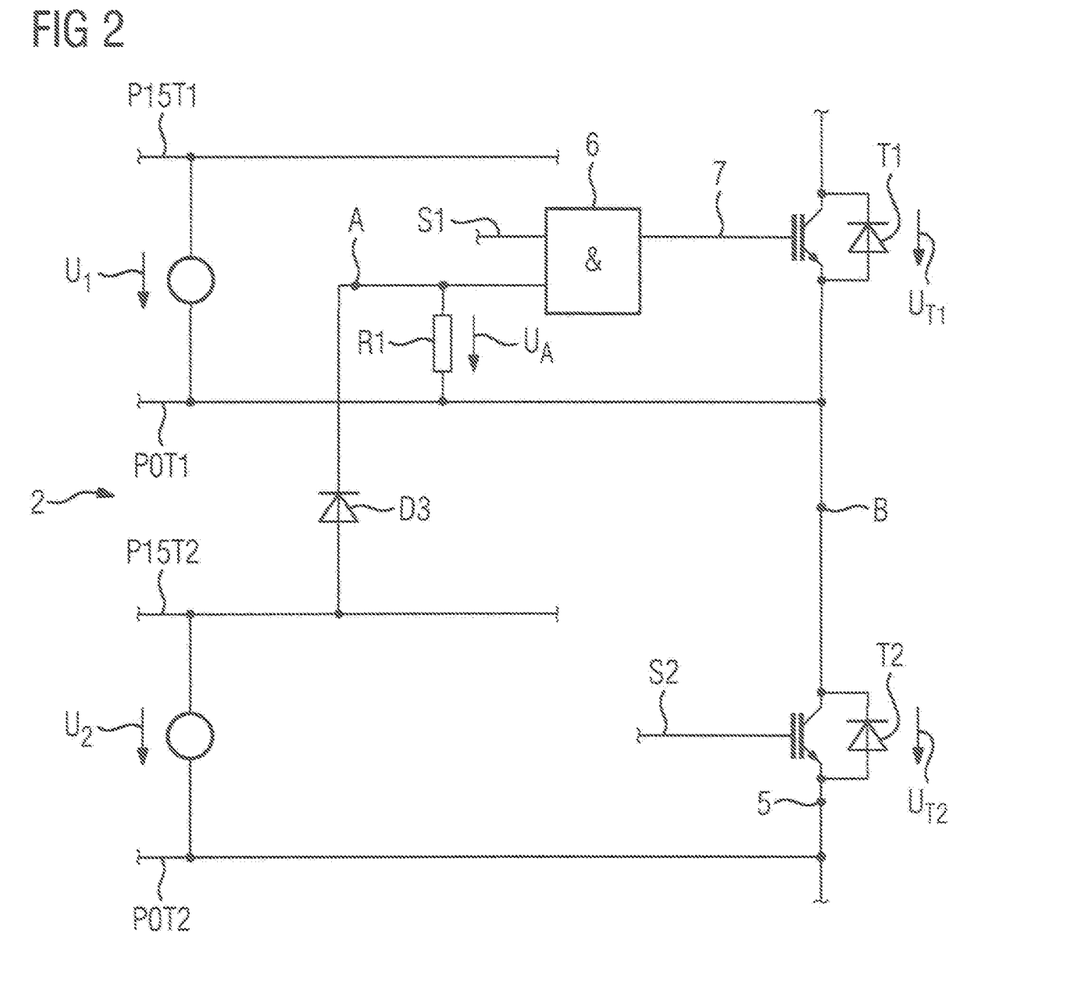
FIG. 2 shows a circuit diagram of an upper half bridge of an inventive neutral point clamped inverter.

Shown in FIG. 2 is an upper half bridge 2 of an inventive neutral point clamped inverter 1. The upper half bridge 2 comprises a diode D3, two transistors T1, T2 and also two activation circuits S1, S2 for the transistors T1, T2. The transistor T1 arranged further up in the plane of the drawing in FIG. 2 is an outer transistor T1 of the upper half bridge 2. The transistor T2 arranged further down in the plane of the drawing in FIG. 2 is an inner transistor T1 of the upper half bridge 2. A respective switch state (on state, off state) of the transistors T1, T2 can be controlled by means of the activation circuits S1, S2.

In accordance with the invention, a signal that reproduces the switch state of the inner transistor T2 is coupled into the activation circuit S1 of the outer transistor T1. This is achieved in the following way:

All potentials used in FIG. 2 relate to the potential POT2 to be found at the bottom in the drawing. A difference between the potential P15T2 and the potential POT2, which is present at an inner terminal of the inner transistor T2 involves a voltage $U_1$ amounting to 15 V for example. A difference between the potential P15T1 and the potential POT1, which is present at the point B involves a voltage $U_2$ amounting to 15 V, for example.

The diode D3 connects the potential P15T2 to a logical AND element 6, into which the activation circuit S1 is also coupled. If the diode D3 is conducting, then the logical AND element 6 gives a signal 7 to the outer transistor, so that this switches to an "on" state.

When the inner transistor T2 is in the "off" state, i.e., when it is switched off, a potential is present at a point B that is higher than a potential P15T2 that is present at an end of the diode D3. Thus, the diode D3 switches off. A voltage $U_A$ between a point A at another end of the diode D3 and the potential of the point B is zero in this case. The logical AND element 6 (independently of the activation circuit S1) does not give a signal 7 to the outer transistor T1, so that this switches to the "off" state.

When the inner transistor T2 switches to the "on" state, i.e., when it switches on, the potential at the point B falls in terms of amount to below the potential P15T2. This causes the diode D3 to go into a conducting state and the voltage $U_A$ becomes positive. Thus, the logical AND element 6 goes into a state which lets through a signal from the activation circuit S1 to the outer transistor T1 as signal 7.

On the one hand, the inventive neutral point clamped inverter enables the outer transistor T1 to be prevented from going into the "off" state after the inner transistor T2 has switched into the "off" state. Moreover, the outer transistor T1 can be prevented from switching on, i.e., switching to the "on" state, before the inner transistor T2 has switched into the "on" state.

The diode D3 must be established, as a rule, to block at least one off-state voltage of the inner transistor T2.

Figure 3:
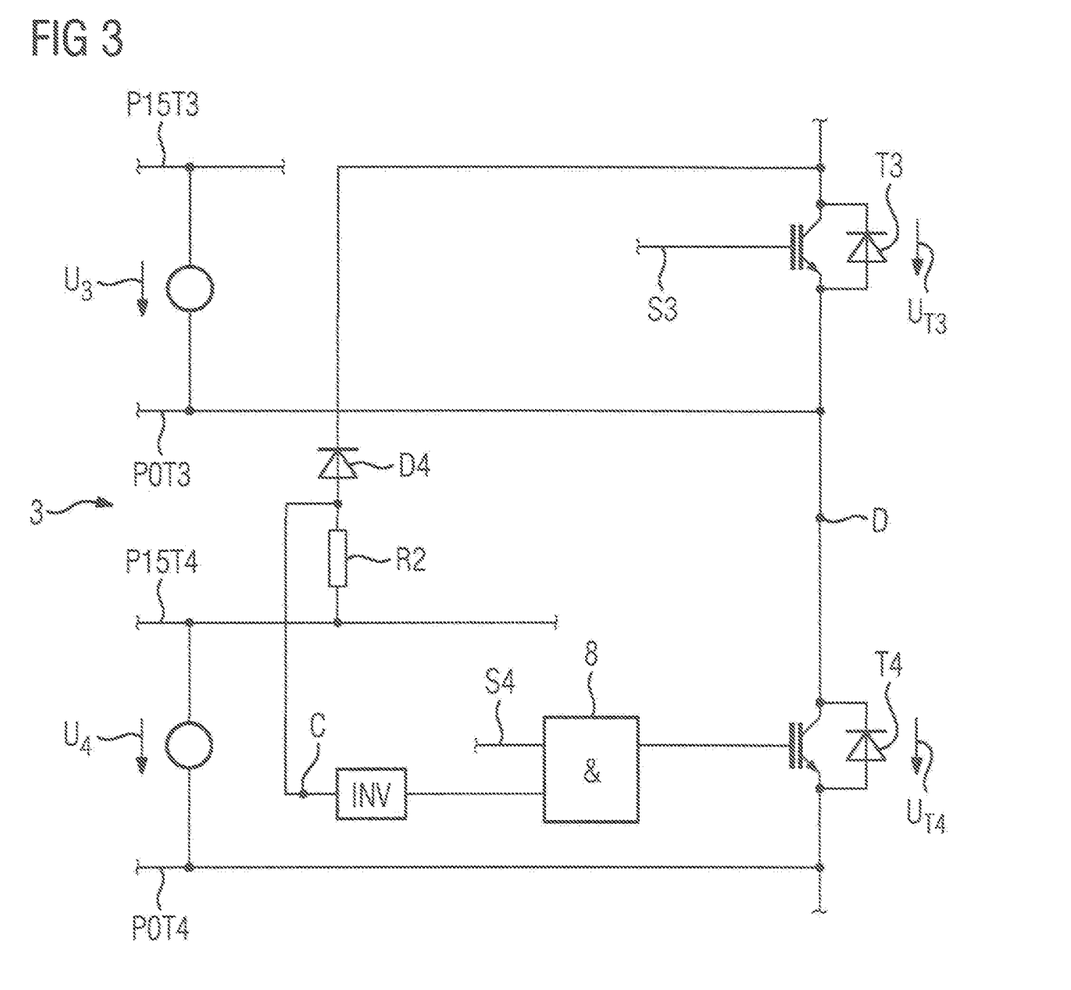
FIG. 3 shows a circuit diagram of a first aspect of a lower half bridge of an inventive neutral point clamped inverter in accordance with a first embodiment.

Shown in FIG. 3 is a lower half bridge 3 of an inventive neutral point clamped inverter 1. All potentials used in FIG. 3 and FIG. 4 relate to the potential to be found at the bottom in the drawing. A difference between the potential P15T4 and the potential POT4 involves a voltage $U_3$ amounting to 15 V, for example. A difference between the potential P15T3 and the potential POT3, which is present at the point D involves a voltage $U_2$ amounting to 15 V, for example.

The lower half bridge 3 comprises a diode D4, two transistors T3, T4 and also two activation circuits S3, S4 for the transistors T3, T4. The transistor T4 arranged further down in the plane of the drawing in FIG. 3 is an outer transistor T4 of the lower half bridge 3. The transistor T3 arranged further up in the plane of the drawing in FIG. 3 is an inner transistor T3 of the lower half bridge 3. A respective switch state (on state, off state) of the transistors T3, T4 can be controlled via the activation circuits S3, S4.

In accordance with the invention, a signal that reproduces the switch state of the inner transistor T3 is coupled into the activation circuit S4 of the outer transistor T4. Moreover, in accordance with the invention, a bridging element is provided, which is configured to interrupt for a specific period of time an influencing of the switch state of the outer transistor T4 by the signal that reproduces the switch state of the inner transistor T3. In order to reach a better understanding, a description is initially given with reference to FIG. 3 of how the signal that reproduces the switch state of the inner transistor T3 is coupled into the activation circuit S4 of the outer transistor T4. This is achieved as follows:

If both the outer transistor T4 and also the inner transistor T3 are switched on, i.e., if they are in the "on" state, then a voltage $U_{T3}$ across the inner transistor T3 and a voltage $U_{T4}$ across the outer transistor T4 are zero. There is thereby a potential P15T4 across the diode D4 in the on-state direction, so that the diode conducts. This causes a potential at a point C, which is connected to a logical AND element 8, to fall. Under this condition a control command of the activation circuit S4, which is likewise connected to the logical AND element 8, will be passed on to the transistor T4.

If in this operating state the inner transistor T3 switches off, i.e., it goes into the "off" state, because of an interruption to the gate supply, for example, then the diode D4 switches off. The potential at the point C thus rises again to a higher value (for example, 15 V). This corresponds to a logical zero of the logical AND element 8, so that the element does not pass on a control command of the activation circuit S4 to the outer transistor T4.

As a rule, the diode D4 must be established to block at least double the off-state voltage of the inner transistor T3 or of the outer transistor T4.

In the circuit shown in FIG. 3 the diode D4 would even block if the transistor T3 is switched on and the transistor T4 is switched off. It would then no longer be possible to switch the transistor T4 on again. A bridging element 9 is provided for this purpose in accordance with the invention, the function of which will be explained with reference to FIG. 4.

Figure 7:
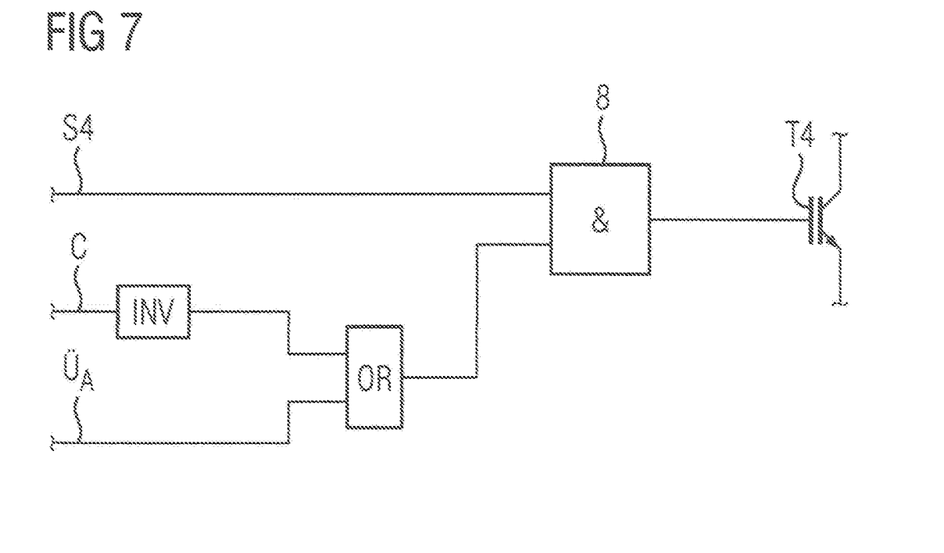
FIG. 7 shows a logic circuit for a bridging element in accordance with the invention.

The bridging element 9 in the present case is a bridging switch 9. However, elements with a similar function, e.g., a MOSFET or a bipolar transistor, or a corresponding logic circuit, as is shown in FIG. 7, can be used as a bridging element. The logical AND element 8 is bridged with a positive switching flank of a control signal of the activation circuit S4 by closing the bridging switch 9.

Figure 5:
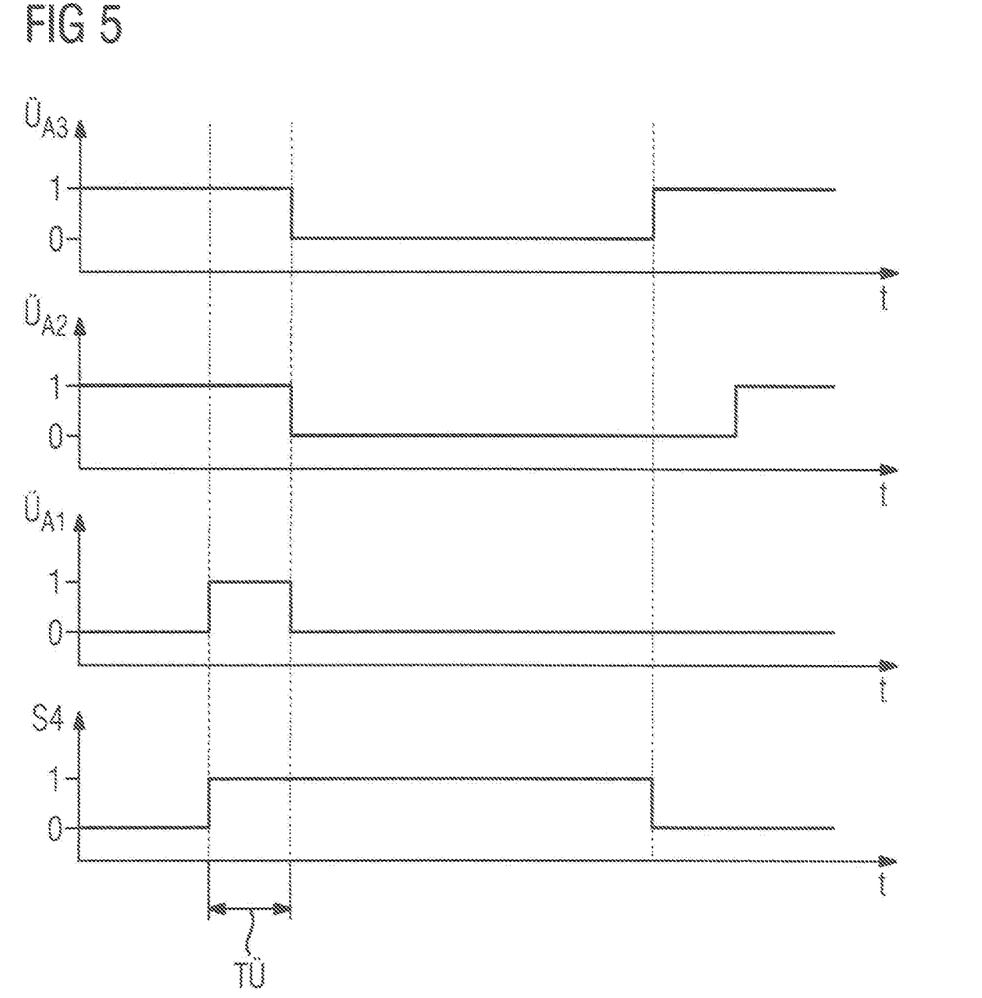
FIG. 5 shows signal waveforms for activating a bridging element of an inventive neutral point clamped inverter.

An associated signal waveform $U_A$ for the bridging switch is shown in FIG. 5. In this case, FIG. 5 shows a normal waveform of a first, second and third signal waveform $U_{A1}$ for the bridging switch 9 as well as a normalized waveform S4 of the activation signal for the outer transistor over the time t.

Figure 4:
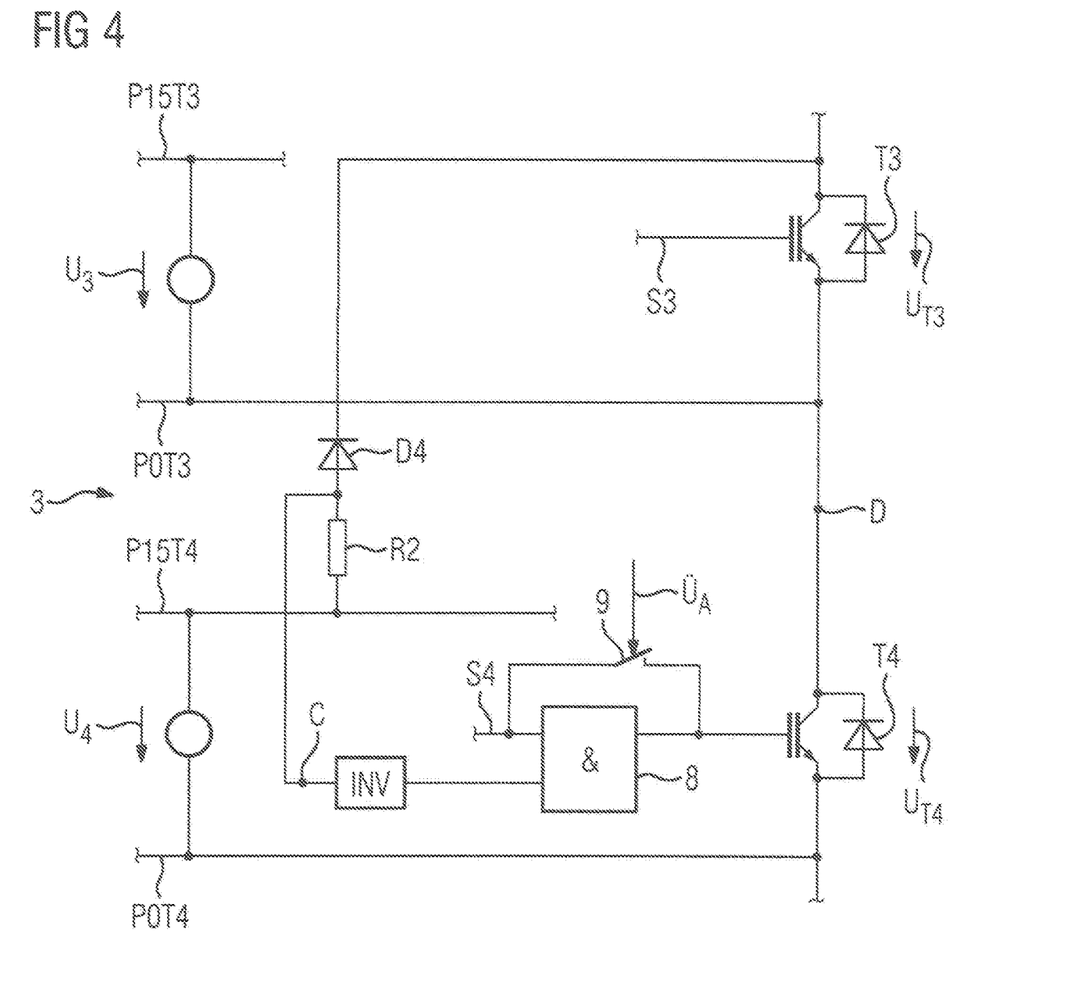
FIG. 4 shows a circuit diagram of a second aspect of a lower half bridge of an inventive neutral point clamped inverter in accordance with a first embodiment.

The relevant signal waveform for the form of embodiment of the invention in accordance with FIG. 4 is the first signal waveform $U_{A1}$.

After a first positive signal flank (seen from the left in terms of time) of the activation signal S4, the bridging switch 9 must be switched on for a period of time $T_ü$. What is achieved by this is that the switching command of the activation signal S4 for the outer transistor T4 switches on the transistor T4 independently of the potential present at the point C. Here, the period of time $T_ü$ is to be selected to be long enough for the transistor T4 to be able to safely reduce its off-state voltage within the period of time $T_ü$ so that a voltage UT4 present across the transistor $U_{T4}$ can fall below a certain value, to below 5 V, for example.

During the period of time $T_ü$, the transistor T3 is not protected against an overvoltage. If the transistor T3 switches off immediately after the first positive switching flank of the control signal S4, then the transistor T3 will be subjected to an impermissibly high voltage. Therefore, the period of time $T_ü$ is, moreover, to be selected short enough such that the transistor T3 cannot be destroyed during the period of time $T_ü$ by the overvoltage. A typical value for the period of time $T_ü$ lies in a range of a few microseconds.

After the period of time $T_ü$ has elapsed, the transistor T4 has switched on and the potential C has fallen to below the potential threshold, for example, to below 5 V. The switching command of the activation circuit S4 is thus passed on by the logical AND element 8 to the transistor T4. Moreover, after the period of time $T_ü$ has elapsed, the bridging switch 9 is opened for the remaining switch-on time of the transistor T4. The inventive monitoring circuit is thus active and the transistor T3 is effectively protected from a damaging overvoltage if switched off in error.

The signals $Ü_{A2}$ and $Ü_{A3}$ in FIG. 5 represent examples of how the signal waveform for the bridging circuit 9 can be created especially easily from the switching command signal of the activation circuit S4. Here, the signal $Ü_{A2}$ represents a waveform of the signal of the activation circuit S4 inverted and shifted by the period of time $T_ü$. The signal $Ü_{A3}$ is an inverted waveform of the signal of the activation circuit S4, where merely a negative flank of the signal $Ü_{A3}$ has been shifted in time by the period of time $T_ü$.

Figure 6:
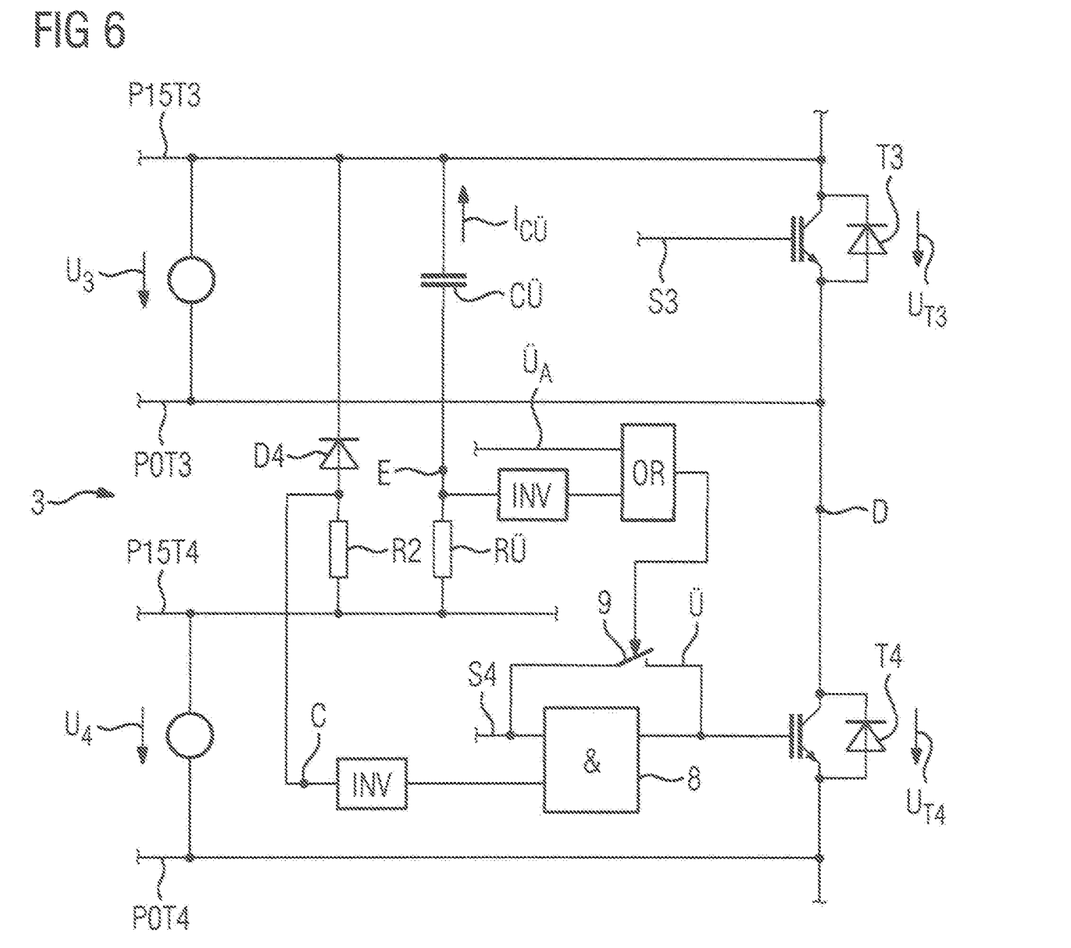
FIG. 6 shows a circuit diagram of a lower half bridge of an inventive neutral point clamped inverter in accordance with a alternative embodiment.

Shown in FIG. 6 is a second embodiment of a lower half bridge 3 of an inventive neutral point clamped inverter 1. All potentials used in FIG. 6 relate to the potential POT4 to be found at the bottom in the drawing. A difference between the potential P15T4 and the potential POT4 involves a voltage $U_3$ amounting to 15 V, for example. A difference between the potential P15T4 and the potential POT4, which is present at the point D involves a voltage $U_2$ amounting to 15 V, for example.

Comparable with the first embodiment of the lower half bridge 3, which is described with reference to FIGS. 3 and 4, the lower half bridge 3 shown in FIG. 6 comprises a diode D4, two transistors T3, T4 and also two activation circuits S3, S4 for the transistors T3, T4.

The transistor T4 arranged further down in the plane of the drawing in FIG. 6 is an outer transistor T4 of the lower half bridge 3. The transistor T3 arranged further up in the plane of the drawing in FIG. 3 is an inner transistor T3 of the lower half bridge 3. A respective switch state (on state, off state) of the transistors T3, T4 can be controlled by means of the activation circuits S3, S4.

Unlike the first embodiment, the lower half bridge 3 comprises a capacitor CÜ and a resistor RÜ, which are provided to act on the bridging switch 9. The two components CÜ and RÜ in the arrangement shown in FIG. 6 within the lower half bridge 3 are also referred to here as differentiators.

The period of time $T_ü$ during which the logical AND element 8 is bridged can be shortened by the providing the capacitor CÜ and the resistor RÜ so far as to only cover a time taken for an activation of the transistor T4 and not a complete duration of the switching flank of the transistor T4. A typical value for the period of time $T_ü$ in this case amounts to 100 ns.

Unlike the circuit in accordance with FIG. 4, the bridging switch 9 will also be closed when a potential at the point E falls below a value of, for example, 15 V, such as to a value below 10 V. The potential at the point E falls whenever a positive current ICÜ is flowing. This is the case when a sum of a voltage $U_{T3}$ across the inner transistor T3 and a voltage $U_{T4}$ across the outer transistor T4 reduces. This is the case in the following permissible operating cases:

The inner transistor T3 is already switched on, i.e., it is in the "on" switch state and the transistor T4 switches on, i.e., it "goes off": This is a usual operating state in which the transistor T4 may switch on.

The transistors T3 and T4 both switch on at the same time, wherein the transistor T3 switches on somewhat earlier than the transistor T4. This case is likewise permissible and the transistor T4 may therefore switch on.

If on the other hand no current ICÜ is flowing after the positive switching flank of the signal of the activation circuit S4 and the period of time $T_ü$ having elapsed, only the transistor T4 switches on and the transistor T3 remains in the off state. This is a critical operating state. Here, the bridging switch 9 will be opened after the period of time $T_ü$ has elapsed. A potential at the point C, because the transistor T3 has not switched on, has not fallen below the required threshold of for example 5V. As a result, the switch-on process of the transistor T4 will be aborted. The transistor T3 will be subjected to an increased voltage during the period of time $T_ü$, and indeed in addition to its static off-state voltage, to precisely the voltage that the transistor T4 has reduced during the period of time $T_ü$. This overvoltage is only small however and cannot damage the transistor T3.

If the transistor T3 switches on, e.g., because, on account of the runtime tolerances, the activation signal of the activation circuit S3 is only delayed slightly in relation to the activation signal of the activation circuit S4, then the potential at the point E falls with the switching on of the transistor T3 and the bridging switch 9 is closed again, so that the transistor T4 also switches on in accordance with the signal of the activation circuit S4. If, on the other hand, the transistor T3 remains switched off, then the transistor T4 also switches on independently of the signal of the activation circuit S4.

The lower terminal of the resistor RÜ in FIG. 6, instead of being connected to the potential P15T4, can also be connected to other potentials relevant to an activation of the transistor T4. This merely causes an offset.

Although the invention has been illustrated and described in greater detail by the preferred exemplary embodiments, the invention is not restricted by the disclosed examples and other variations can be derived herefrom by the person skilled in the art without departing from the scope of protection of the invention.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A neutral point clamped inverter comprising:
an upper half bridge; and
a lower half bridge;
wherein the upper half bridge and the lower half bridge each include a respective inner transistor and a respective outer transistor;
wherein the inner transistor of the upper half bridge is configured to interact with the outer transistor of the upper half bridge such that a signal that reproduces a switch state of the inner transistor of the upper half bridge and which is established without taking into consideration an activation circuit of the inner transistor of the upper half bridge which is coupled directly into an activation circuit of the outer transistor of the upper half bridge for switching the outer transistor of the upper half bridge and directly influences a switch state of the outer transistor of the upper half bridge, the activation circuit of the outer transistor of the upper half bridge being directly coupled to a logic element; and
wherein an effect of the signal that reproduces the switch state of the inner transistor of the upper half bridge acts on the switch state of the outer transistor of the upper half bridge without any potential disconnection, such that the outer transistor of the upper half bridge cannot be placed into an "off" switch state after the inner transistor of the upper half bridge is placed into an "off" switch state and such that the outer transistor of the upper half bridge cannot be put into an "on" switch state before the inner transistor of the upper half bridge is placed into an "on" switch state.

2. The neutral point clamped inverter with the upper half bridge and the lower half bridge of claim 1, wherein each half bridge includes a respective inner transistor and a respective outer transistor;
wherein the inner transistor of the lower half bridge is configured to interact with the outer transistor of the lower half bridge such that a signal which reproduces a switch state of the inner transistor of the lower half bridge and which is established without taking into consideration an activation circuit of the inner transistor of the lower half bridge is coupled directly into an activation circuit for switching the outer transistor of the lower half bridge and directly influences a switch state of the outer transistor of the lower half bridge;
wherein an effect of the signal that reproduces the switch state of the inner transistor of the lower half bridge acts on the switch state of the outer transistor of the lower half bridge without any potential disconnection; and
wherein the activation circuit for switching the outer transistor of the lower half bridge includes a bridging element, which is configured to interrupt for a certain period of time a direct influence of the switch state of the outer transistor of the lower half bridge by the signal that reproduces the switch state of the inner transistor of the lower half bridge such that the inner transistor of the lower half bridge cannot be placed into an "off" switch state after the outer transistor of the lower half bridge is placed into an "off" switch state and that the outer transistor of the lower half bridge cannot be placed into an "on" switch state before the inner transistor of the lower half bridge is placed into an "on" switch state.

* * * * *